Patented July 19, 1949

2,476,606

UNITED STATES PATENT OFFICE 2,476,606

STABILIZED VINYL FLUORIDE POLYMERS

Frederick L. Johnston, Claymont, and Henry J. Richter, Wilmington, Del., assignors to E. I. du Pont de Nemours & Company, Wilmington, Del., a corporation of Delaware No Drawing. Application July 4, 1945, Serial No. 603,266

4 Claims. (Cl. 260—45.85)

This invention relates to a new class of synthetic resins possessing excellent thermal stability and more particularly refers to synthetic resins containing polyvinyl fluoride stabilized with glyceryl monolaurate.

While polyvinyl fluoride is known to possess greater thermal stability than polyvinyl chloride and interpolymers containing substantial proportions of vinyl chloride, nevertheless it must ordinarily be worked at such high temperatures that this additional thermal stability is of slight practical importance, particularly when high temperature working is accompanied with high pressures, as in molding and extrusion operations. For instance, when polyvinyl fluoride is heated to 190° C. or higher in a confined space under substantial pressure serious degradation of the polymer occurs and this degradation increases with a rise in the temperature. Furthermore, the degradation of polyvinyl fluoride under the foregoing conditions frequently occurs rapidly and sometimes with explosive violence, due to the formation of gaseous decomposition products which appear to catalyze the degradation reaction. This would explain the profound increase in degradation of this material which takes place when it is worked not only at high temperatures but under substantial pressures. Since polyvinyl fluoride would be of considerable value in molding and extrusion operations but for the disadvantage referred to, it is evident that anything which overcomes this disadvantage would be of appreciable practical importance.

It is an object of this invention to overcome the foregoing disadvantages and others which directly or indirectly result therefrom. A further object is to produce polyvinyl fluoride compositions which will withstand extended heating at temperatures of 190° C. and higher under substantial pressures without appreciable degradation. A still further object is to reduce markedly the rate at which polyvinyl fluoride and compositions containing substantial amounts of this material will degrade at elevated temperatures and pressures. A still further object is to prepare polyvinyl fluoride compositions which are characterized by reduced flammability and improved plasticity at temperatures used for molding and extrusion. Additional objects will become apparent from a consideration of the following description and claims.

These objects are attained in accordance with the present invention wherein polyvinyl fluoride is stabilized with glyceryl monolaurate. By the addition to polyvinyl fluoride compositions of small amounts of glyceryl monolaurate varying, as a rule, from about 0.1% to 10%, by weight, it has been found that the rate of degradation of the final product is markedly reduced, permitting the use of these compositions for many molding and extrusion operations wherein they could not heretofore be employed.

The invention may be more readily understood by a consideration of the following illustrative examples wherein the quantities are stated in parts by weight.

Example 1

Glyceryl monolaurate (2 parts) was dispersed in 450 parts of diethyl ether and 100 parts of powdered orientable polyvinyl fluoride was thoroughly mixed in. The mixture was agitated while the ether evaporated at room temperature. A small sample of the dry stabilized orientable polyvinyl fluoride thus prepared was placed between aluminum foils in a Carver laboratory press and pressed at 250° C. for 5 minutes under 10,000 p. s. i. pressure. This molding process caused the material to coalesce into a tough coherent film of polymer which was completely colorless when cooled and removed from the press. A sample of this same lot of orientable polyvinyl fluoride but without the glyceryl monolaurate stabilizer was pressed between aluminum foils in a Carver press at 250° C. under 10 000 p. s. i. pressure. At the end of 3 minutes the polymer was completely charred into a black friable mass. In similar stability tests where the compositions were pressed for 5 minutes between aluminum foils under 10,000 p. s. i. pressure as above but at 275° C. instead of 250° C. the composition stabilized by incorporating 2 parts of glyceryl monolaurate into 100 parts of orientable polyvinyl fluoride showed localized darkening in about 1% of the area of the resulting tough coherent film, the remainder being colorless. A control sample of unstabilized orientable polyvinyl fluoride decomposed suddenly to a black friable mass at the end of 20 seconds.

Example 2

Orientable polyvinyl fluoride (100 parts) was stabilized by the incorporation of glyceryl monolaurate (1 part). The resulting composition was injection molded using an injection cylinder temperature of 210° C. and operating at an injection cylinder pressure of 24,200 lbs./in. Specimens of exceptionally good color were obtained and there was no evidence of decomposition of the polyvinyl fluoride. Unstabilized orientable polyvinyl fluoride in an injection molding machine under the same temperature and pressure conditions was completely decomposed before it had passed through the injection cylinder.

*Example 3*

Orientable polyvinyl fluoride compositions stabilized with glyceryl monolaurate as in Examples 1 and 2 were compared with unstabilized orientable polyvinyl fluoride in the A. S. T. M. flammability test D635–41T. Specimens used were bars ½" x ⅛" x 5". Results were as follows:

| Parts of Glyceryl Monolaurate per 100 Parts Orientable Polyvinyl Fluoride | Burning Rate According to A. S. T. M. Test D635–41T |
| --- | --- |
| 0 (Unstabilized) | 0.55 inch per min. |
| 1 (as in Example 2) | Self extinguishing. |
| 2 (as in Example 1) | Do. |

It is to be understood that the foregoing representative examples may be varied widely with respect to the reactants, the amounts thereof and the conditions of reaction without departing from the scope of this invention.

In place of polyvinyl fluoride it is contemplated that compositions containing this material in chemical and/or physical association with other materials may be employed. Thus, interpolymers of vinyl fluoride and dissimilar polymerizable materials may be stabilized with glyceryl monolaurate. Among the dissimilar polymerizable materials contemplated for this purpose may be mentioned vinyl chloride, ethylene, tetrafluoroethylene, monochlorotrifluoroethylene, etc. As a general rule, it is preferred to produce interpolymers of vinyl fluoride and dissimilar polymerizable materials of the vinyl class, i. e., containing the ethylene linkage.

In addition to interpolymers such as those referred to previously it is contemplated that physical mixtures may be treated in accordance with this invention. For instance, polyvinyl fluoride or interpolymers of vinyl fluoride and other polymerizable materials may be admixed with other resins, plasticizers, pigments, fillers, and the like, in accordance with expedients well known and widely used in the plastics industry.

Where materials other than polyvinyl fluoride per se are treated in accordance with the instructions hereof, it is, in general, advisable that the vinyl fluoride content of the ultimate composition should amount to more than 50% thereof. This figure is not, of course, critical, and will vary somewhat depending upon the particular material or materials admixed with polyvinyl fluoride or reacted with vinyl fluoride. However, since the stabilizing effects of glyceryl monolaurate appear to be peculiarly adaptable to polyvinyl fluoride, it is self-evident that for optimum results this material should generally preponderate in the final composition.

The amount of glyceryl monolaurate incorporated with the polyvinyl fluoride may vary widely, and compositions containing as little as 0.1% or as much as 10% of the monolaurate have been found to be noticeably improved thereby. Above 10% it has been found that the glyceryl monolaurate is not well retained by the polyvinyl fluoride, although of course the addition of other materials to the composition will vary to a certain extent the amount of glyceryl monolaurate which is retained thereby. As a general rule, it may be stated that from about 1% to about 3% of glyceryl monolaurate will produce a profound change in the thermal stability of the polyvinyl fluoride composition in which it is incorporated.

In addition to improving the heat stability of polyvinyl fluoride compositions, it should also be noted that glyceryl monolaurate in concentrations from about 1% to about 10%, by weight, imparts lubricating and plasticizing properties to the composition. This results in smoother flow of the polyvinyl fluoride compositions when they are injection molded or extruded. Furthermore, it improves the surface smoothness and toughness of the resulting molded or extruded articles.

Glyceryl monolaurate can be readily incorporated into polyvinyl fluoride compositions by dry grinding of the powdered polymer with the stabilizer, by wet grinding as in a ball mill in the presence of water or organic liquids, by milling together on a heated rolling mill, or by working together as in a Banbury mixer. It is understood, of course, that this stabilizer may be incorporated in these compositions by other suitable means well known to those familiar with this art.

In the practice of this invention it is preferred to use the orientable form of polyvinyl fluoride. The preparation of orientable polyvinyl fluoride is described in U. S. Patent 2,419,008 and U. S. Patent 2,419,010. Both the orientable and unorientable forms of polyvinyl fluoride are stabilized by the incorporation of glyceryl monolaurate. However, the utility of the resulting composition is best realized in operations such as molding and extrusion where the composition is subjected to heat and pressure, and it is preferred to use the orientable form of polyvinyl fluoride since it yields molded and extruded objects of greater utility due to superior mechanical properties.

While the difference between the orientable form of polyvinyl fluoride and the form which is not orientable is well known, for the sake of completeness it may be defined as follows:

Polyvinyl fluoride is shown to be orientable by means of a simple test. A filament or a narrow strip of pressed film is subjected to a longitudinal stress. It elongates up to several hundred per cent, namely, at least 100 and up to 400 or more, in contrast to unorientable polyvinyl fluoride which elongates only a few per cent until the ultimate tensile strength is exceeded and the sample breaks.

It is necessary that an adequately fused sample be used in the test and this is suitably obtained from a film prepared by subjecting the polymer to a temperature of 200° C. at a pressure of about 10,000 lbs. per sq. in. for 3 to 5 min.

Before orientation the polyvinyl fluoride shows an X-ray defraction pattern characteristic of a crystalline powder while the oriented polyvinyl fluoride shows the pattern characteristic of an oriented fibre.

The orientable polyvinyl fluoride can also be oriented by rolling or pressing in such a way as to produce elongation. The type of elongation occurring when a filament of orientable polymer is stretched in a solid state, namely, at a temperature below its softening temperature, is known as "cold drawing" and is characterized by the fact that the sample acquires a permanent elongation.

In addition to the change in structure indicated by the X-ray defraction diagram, there is an increase in the tensile strength measured in the direction of elongation and an increase in the stiffness or modulus of elasticity.

As many widely different embodiments of this invention may be made without departing from the spirit and scope hereof, it is to be understood that the invention is not limited to the specific embodiments hereof except as defined in the appended claims.

We claim:

1. A polymer comprising the polymerization product of vinyl fluoride and containing at least 50% by weight of polymerized vinyl fluoride, said polymer containing as a thermal stabilizing agent from 0.1% to 10% glyceryl monolaurate based on the weight of the polymerized vinyl fluoride contained in the said polymer.

2. A copolymer comprising the copolymerization product of vinyl fluoride and vinyl chloride, said copolymer containing at least 50% by weight of polymerized vinyl fluoride and the said copolymer containing as a thermal stabilizing agent from 0.1% to 10% glyceryl monolaurate based on the weight of the polymerized vinyl fluoride contained in the said copolymer.

3. A polyvinyl fluoride polymer containing as a thermal stabilizing agent from 0.1% to 10% glyceryl monolaurate based on the weight of the said polyvinyl fluoride.

4. An orientable polyvinyl fluoride polymer containing as a thermal stabilizing agent from 0.1% to 10% glyceryl monolaurate based on the weight of the said polyvinyl fluoride.

FREDERICK L. JOHNSTON.
HENRY J. RICHTER.

REFERENCES CITED

The following references are of record in the file of this patent:

UNITED STATES PATENTS

| Number | Name | Date |
|---|---|---|
| 2,307,092 | Yngve | Jan. 5, 1943 |
| 2,316,169 | Japs | Apr. 13, 1943 |
| 2,350,199 | Staley | May 30, 1944 |